July 17, 1962   G. MINUTILLO   3,044,575
GARAGE DRIP PAN
Filed July 5, 1961

INVENTOR.
Gaetano Minutillo
BY
ATTORNEY

United States Patent Office 3,044,575
Patented July 17, 1962

3,044,575
GARAGE DRIP PAN
Gaetano Minutillo, 116 Linden St.,
Rockville Centre, N.Y.
Filed July 5, 1961, Ser. No. 122,009
1 Claim. (Cl. 184—106)

This invention relates to a garage drip pan, and has for an object to provide an improved garage drip pan, intended for use particularly on a garage floor to be placed on the surface thereof, so that a car stored in the garage may be stored over the drip pan to catch all grease, oil or dirt dripping or flowing from the vehicle, and prevent it from soiling the garage floor.

A further object of this invention is to provide a garage drip pan which can catch the dirt, grease and oil dripping from the bottom of a vehicle and which has a smooth surfaced flanged bottom which can be easily cleaned from time to time of all accumulation of dirt, grease or oil.

Still a further object of this invention is to provide a garage drip pan made of a suitable, somewhat yieldable plastic material so that it may be readily rolled up for either storage or shipping purposes, and may be readily unrolled and placed in operative position on a garage floor.

Still a further object of this invention is to provide a garage drip pan having a flanged, smooth surface wherein the flanged sides are of a width not greater than the width of the tread of the vehicle which will be garaged thereover, and which is provided with integrally extending tread receiving portions, so that the vehicle wheels may rest thereon, the tread receiving portions being preferably knurled by embedding reinforcing threads therein which treads raise the surface and thereby knurl the same.

With the above and related objects in view, this invention consists in the details of construction and combination of parts, as will be more fully understod from the following description, when read in conjunction with the accompanying drawing, in which.

Figure 1:
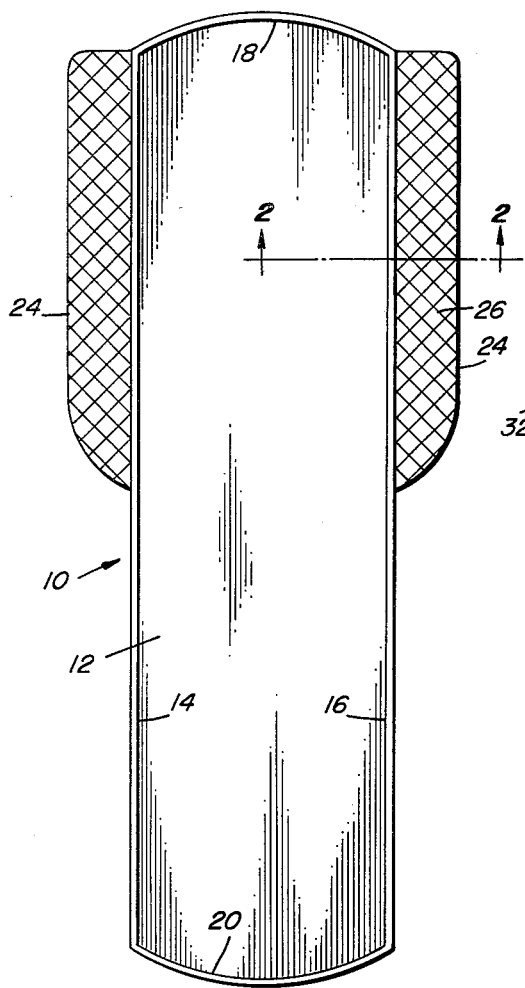
FIG. 1 is a plan view of one form of drip pan of this invention.

There is shown at 10 one form of drip pan of this invention. This drip pan 10 as shown consists of a smooth finish bottom portion 12 having two parallel sides 14 and 16, the width of the parallel sides being not greater than the width of the tread of the vehicle which is to be garaged thereover. Obviously, in view of the many sizes of vehicles that are in ordinary use, such as standard size automobiles, compact automobiles, trucks, etc., the drip pan 10 will be made in appropriate size with the sides of appropriate width according to the size of the vehicle which is to be garaged thereover. Integrally extending upwardly from the two parallel sides 14 and 16 and likewise from the rounded ends 18 and 20 of the smooth finish bottom 12 is provided a rounded border flange 22, this border flange 22 being of sufficient height and width, preferably a diameter of approximately five-eighths of an inch, to accumulate and hold any grease, oil or dirt that may drip or fall onto the surface 12. For a standard gauge vehicle, the width between the sides may be 48¾ inches, thus making the length between the outer edges of the flange 22 as approximately 50 inches, it being intended that the thickness of the bottom 12 may be approximately 1/16 of an inch. Obviously, these sides and any other sizes herein mentioned, are mentioned for illustrative purposes only, and not as limitations.

Extending integrally from the outer sides of the border flanges 22 of the bottom 12 are two tread receiving portions or wings 24. These wings 24 are generally of the same material and thickness as the bottom 12, being integrally extending therefrom, but on the upper surface of the wings or tread receiving portions 24 there is embedded a plurality of criss-cross threads 26 of appropriate material such as plastic or glass fiber, these threads 26 thus providing a knurled surface on these wings or tread receiving portions 24.

Figure 3:
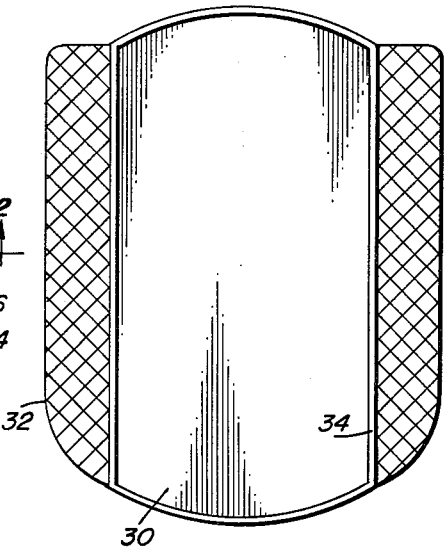
FIG. 3 is a top plan view of a modified form of this invention.

In the form of invention shown in FIG. 1, the smooth bottom floor extends a length substantially greater than the length of the wings or tread receiving portions 24. In FIG. 3, the bottom portion 30 extends a length equal to the length of its wing portions 32, although as apparent, the front and rear ends of both forms are rounded, so as to provide a neat appearance on the garage floor and in addition, a rounded end tends to cause any accumulated grease or oil to flow over the middle thereof when the same is being cleaned.

Figure 2:
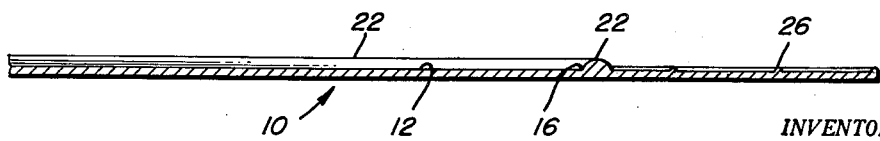
FIG. 2 is a section view on line 2—2 of FIG. 1 on a much larger scale.

The material and construction of the drip pan shown in FIG. 3 with its rounded border flange 34 extending about the smooth finish bottom 30 is otherwise substantially identical with that shown in FIGS. 1 and 2.

In operation, a drip pan of a size appropriate to the tread of the vehicle which is to be garaged thereover, either in the large size of FIG. 1 or the small size of FIG. 3, is placed on the floor in the usual position in which the car is to be garaged, and the car driven thereover, until either one pair or both pairs of the wheels of the vehicle are placed on the wings or tread portions 24. When grease, oil or dirt accumulate on the smooth finish, it may be picked up and taken to a suitable location and then cleaned or washed, and then brought back and placed in operative position.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A garage drip pan for a vehicle comprising a bottom of homogeneous plastic material of suitable length and having two parallel sides spaced apart a width not greater than the tread of a garaged vehicle beneath which it is to be used, an upwardly extending marginal border flange completely surrounding said bottom and integral therewith, tread receiving wings integrally extending from said opposite parallel sides of said flanged bottom to beyond the vehicle tread, and reinforcing criss-cross thread embedded in the said tread receiving wings providing a raised, knurled surface therein, the surface of said bottom between said surrounding border flange having a smooth finish, the surface of said border flange being rounded in cross section, the opposite ends of said pan bottom being convexly rounded, said tread receiving wings extending only from that portion of the pan bottom which is to be located under the motor portion of the garaged vehicle.

References Cited in the file of this patent
UNITED STATES PATENTS
2,996,150    Cassem ------------------ Aug. 15, 1961